June 10, 1969  F. G. LA LONE ET AL  3,448,822
VEHICLE ANTI-COLLISION AUTOMATIC CONTROL-SYSTEM
Filed June 23, 1966  Sheet 1 of 5

INVENTORS
FRANCIS G. La LONE
FRANK R. La LONE

BY Claude A. Patalidis
ATTORNEY

United States Patent Office 3,448,822
Patented June 10, 1969

3,448,822
VEHICLE ANTI-COLLISION AUTOMATIC CONTROL-SYSTEM
Francis G. La Lone, Pontiac, and Frank R. La Lone, Royal Oak, Mich., assignors to Micro-Electronics International, Inc., Detroit, Mich., a corporation of Michigan
Filed June 23, 1966, Ser. No. 559,856
Int. Cl. B60k 27/00; B60t 7/16
U.S. Cl. 180—98                    17 Claims

ABSTRACT OF THE DISCLOSURE

A vehicle anti-collision control system having a radiating element for radiating a narrow beam of microwave energy forwardly in the path of the vehicle and for receiving the microwave energy reflected by an obstacle. A Doppler effect signal dependent from the rate of closing or opening between the vehicle and the obstacle is modified in function of the speed of the vehicle and is accepted only if the vehicle and the obstacle are closing. The resulting signal which is proportional to the rate of closure between the vehicle and the obstacle is utilized to opearte the controls of the vehicle for declerating or stopping the vehicle to avoid collision with the obstacle.

---

The present invention relates to an automatic control system for preventing collisions between self-propelled vehicles such as automobiles, trucks, buses, trains, ships, taxiing aircraft and the like. More particularly the invention relates to an automatic control system for such vehicles causing the same to be automatically slowed or stopped under dangerous conditions, independently of the mental and physical reactions of the vehicle operator.

The present invention is a substantial improvement upon United States Letters Patent No. 2,804,160, issued Aug. 27, 1957 to George Rashid. The description of the present invention will be made with respect to an example of application of the principles of the invention to the automatic control of a highway motor vehicle such as a passenger automobile, a truck, a bus or the like. It should nevertheless be kept in mind that the principles of the present invention are applicable to the automatic control of any other self-propelled vehicle, as hereinbefore mentioned, without departing from the spirit and scope of the invention.

Highway safety is at the present a very acute issue of great concern to the public in general, legislators, to law enforcement agencies, and the like. The present invention provides an effective solution to one of the most common highway hazards on ordinary highways, and more particularly on the new "superhighways" or highways of limited access. Rear end collisions on such highways, and particularly chain-reaction rear end collisions are rather common and are due to many causes such as motor vehicle operator delays in mental and physical reactions, poor judgment of minimum safe stopping distances at various speeds, poor evaluation of the road conditions, so-called "highway hypnosis," and the like. Motor vehicle operators failure to take in consideration all of those factors, or failure to properly evaluate them, often results in collisions when motor vehicle operators are suddenly confronted with a situation requiring rapid responses to stimuli. When a vehicle in a line of closely spaced vehicles traveling at a given speed stops suddenly, it is very frequent for the vehicle immediately following to collide with the stopped or decelerating vehicle, and for a substantially large number of vehicles in the line to successively collide with the immediately preceding vehicle. Such chain reaction collisions result in serious property damages and very often in very serious personal injuries and death casualties.

The present invention provides a solution to such a problem by supplying automatic vehicular controls having an immediate reaction and capable of slowing down or stopping the vehicle under emergency conditions independently of the vehicle operator reactions. The invention provides a device which, at all times, monitors the distance between a moving vehicle on which the invention is installed and an obstacle which may present a collision hazard. The present invention provides for constant monitoring of important parameters corresponding respectively to the distance separating a vehicle from an obstacle, the rate of closure between the vehicle and the obstacle, and the instantaneous velocity of the vehicle. When such parameters indicate a hazardous condition, the invention provides for automatic manipulation of the vehicle controls so as to prevent a collision between the vehicle and the obstacle, or, alternately, so as to maintain proper and safe separation between the vehicle and a moving vehicle, or obstacle, immediately preceding.

The principal object of the present invention, therefore, is to provide an anti-collision automatic control system for a motor vehicle and the like which operates the vehicle controls, such as the brake and the throttle, independently of the mental and physical reactions of the vehicle operator to danger stimuli.

It is another object of the present invention to provide an automatic anti-collision device for a self-propelled vehicle which utilizes microwave signals reflected from an obstacle, such signals being transmitted and received by an apparatus installed in the self-propelled vehicle itself, without the necessity of any external control or signaling means not located on the vehicle.

It is a further object of the present invention to provide a control system for a vehicle which automatically decelerates or stops the vehicle when operating conditions so require, independently of the vehicle operator reactions and normal manual control over the vehicle.

It is another object of the present invention to provide an automatic control system for a self-propelled vehicle which is responsive to various parameters or factors determining safe stopping distances under normal driving conditions so as to maintain minimum safe dstances between the vehicle and another vehicle preceding it, and capable of stopping the vehicle to avoid collision with the preceding vehicle in the event of closing betwen the two vehicles.

It is a further object of the present invention to provide an anti-collision vehicle automatic control having a speed-distance parameter input so as to be responsive to the speed-distance factor governing the necessary reaction time for safely decelerating or stopping a vehicle on which the invention is installed.

It is a further object of the invention to provide an anti-collision vehicle automatic control system which enables the vehicle operator to readily override the automatic control system when so necessary.

It is a further object of the present invention to provide a unitary anti-collision automatic control for vehicle comprising a combined microwave transmitter-receiver, associated circuitry and control elements which may be packaged in a substantially small and compact unit which can be readily mounted in position on a vehicle, which is sturdy, which is reliable in operation and which may be manufactured and sold at a reasonable price.

Other objects and advantages of the present invention will become apparent when the following description of a preferred example of an anti-collision automatic control system for a motor vehicle according to the principles of the invention, and being herein disclosed for illustrative purposes only, is considered in connection with the accompanying drawings wherein:

Briefly stated, the present invention, in the illustrative embodiment thereof explained hereinafter in details, contemplates forwardly radiating a narrow beam of unmodulated microwaves directly along the path of a moving vehicle, receiving the reflection of the microwaves upon an obstacle, developing a Doppler effect signal of a frequency commensurate with the rate of closing of the vehicle upon the reflecting obstacle or, alternately, dependent from the rate of opening therebetween, developing a signal in function of the amplitude of the reflected signal indicating the proximity of the reflecting obstacle from the vehicle, amplifying the Doppler effect signal through parallel channels, modifying the gain of one such channel according to the speed-distance information obtained preferably in the present embodiment from the firing frequency of the ignition distributor of the vehicle, rejecting the Doppler signal indicating an opening between the vehicle and the reflecting obstacle and utilizing only the closing Doppler signal through a differentiating means adapted to trigger a monostable multivibrator, detecting a signal proportional to the rate of closure between the vehicle and the obstacle and summing up such detected signal with the signal representing the speed-distance information for energizing, through a power amplifier circuit, the diverse controls of the vehicle regulating the instantaneous velocity thereof.

Figure 1:
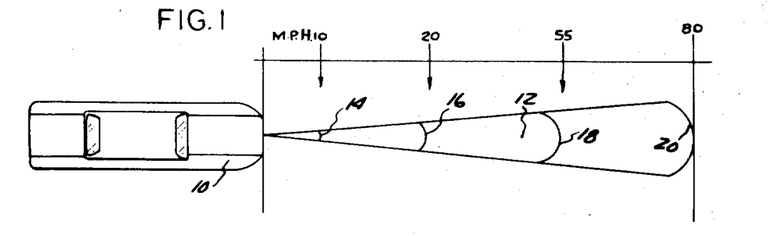
FIGS. 1-3 illustrate the present invention in a general way as applied to highway vehicles such as passenger cars, trucks and buses.
Figure 2:
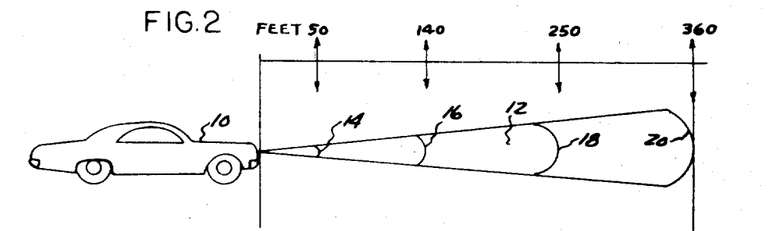
Figure 3:
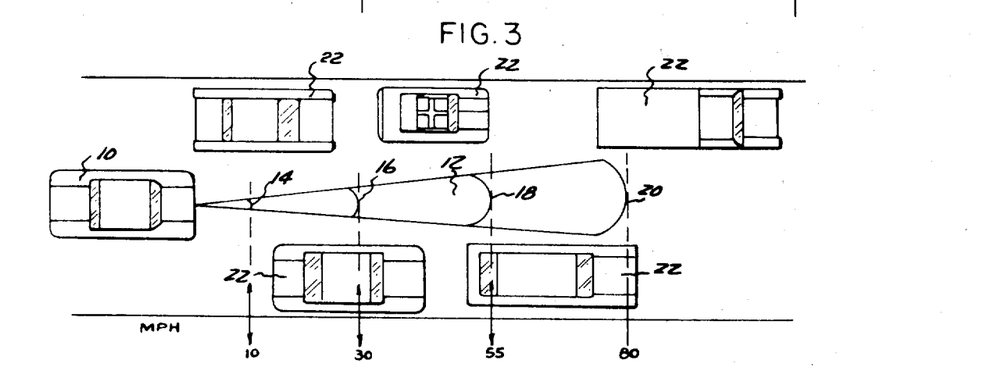

Referring now to the drawings, and more particularly to FIGS. 1-3 thereof, the apparatus of the present invention installed on an automobile 10, or like self-propelled vehicle, radiates a beam of microwave energy 12 in the direction of travel of the automobile. The beam is substantially narrow, both in the vertical and horizontal directions, and consists of transmitted carrier microwaves in the X-band (about 10 gc.). If the transmitted wave meets an obstacle, waves are reflected back toward the vehicle and are received through the antenna (not shown) carried thereby and are adapted, after transformation through the circuits of the invention as hereinafter explained in further details, to operate the controls of the automobile 10 so as to prevent collision with the obstacle. The gain of the apparatus according to the invention is modified in function of the speed of the automobile 10 in such a manner that the reflected waves have no action upon the controls of the automobile except if the speed-distance conditions are satisfied. For example, as indicated in FIGS. 1 and 2, if the vehicle 10 is traveling at 10 m.p.h., the waves reflected by an obstacle situated beyond zone 14 of beam 12 have no effect on the vehicle controls, such zone 14 corresponding to a distance of approximately 50 feet ahead of the vehicle. However, if the vehicle is traveling at 20 m.p.h., any obstacle reflecting the waves and situated between the vehicle and zone 16, corresponding to approximately 140 feet, will have an action upon the vehicle controls, proportionally to both the speed of the vehicle and the rate of closure of the vehicle with the obstacle. Any obstacles situated beyond zone 16, although reflecting the waves, will have no effect upon the vehicle controls, because the gain of the receiving section of the apparatus according to the invention has been reduced by the speed-distance portion thereof so as to reject signals resulting from such reflected waves. On FIGS. 1-2 are also shown zones 18 and 20 corresponding respectively to vehicle speeds of 55 and 80 m.p.h., and to distances of 250 and 360 feet.

FIG. 3 illustrates one of the properties of the invention; as a result of the narrowness of the radiated microwave beam 12, no reflection of the waves is received by the antenna mounted on the automobile 10 when traveling along a street or highway having cars and other motor vehicles, such as shown at 22, parked on both sides thereof. However, it is evident that, in the event that the automobile 10 is not perfectly aligned with a free path between parked motor vehicles, reflected waves may be received by the antenna, if the other parameters of distance and speed are fulfilled. Consequently, the automatic anti-collision control system of the invention operates also in cases where there is a possibility of collision between a moving vehicle 10 and any immobile obstacle such as a parked vehicle along a street or highway.

Figure 4:
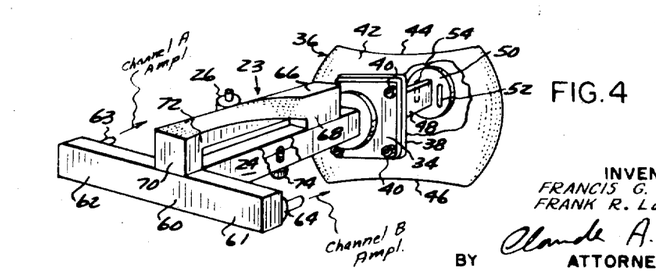
FIG. 4 is a schematic illustration of the microwave section of a preferred example of the invention, shown in perspective view.
Figure 5:
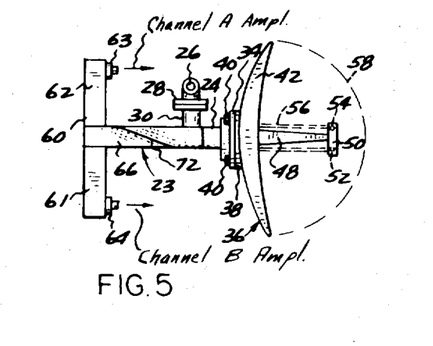
FIG. 5 is a top plan view of the microwave section of FIG. 4.

The microwave transmitting and receiving portion of an example of anti-collision control system for a motor vehicle, according to the invention, and as represented in FIGS. 4–5, includes a waveguide assembly designated generally by numeral 23, and made of the well known rectangular, in cross section, thin-walled brass waveguides. The microwave section 23 comprises a straight through waveguide 24 into which microwave energy is fed from a klystron 26 mounted by way of flange 28 to a short waveguide 30 connected to the straight through waveguide 24 proximate one end thereof. The end of straight through waveguide 24, proximate to which is connected shortwave guide 30, is provided with a flange 34 forming a mounting means for a cutler feed parabolic reflector antenna designated at 36. The antenna 36 is provided with flange 38 for mounting upon flange 34 by any conventional means such as screws or bolts 40, and includes a parabolic reflector 42 having straight upper and lower edges, as shown respectively at 44 and 46 on FIG. 4. The straight upper and lower edges 44 and 46 of the reflector 42 provide for a substantially narrow vertical beam so as not to produce any reflection from obstacles disposed overhead along the highway, such as overpasses and bridges. Antenna 36 is further provided with a tapering, when seen in plane view as in FIG. 5, projection 48, made of a thin-walled waveguide, on the tapered end of which is mounted a short length cylindrical resonant cavity 50 provided with two symetrically arranged apertures 52 and 54 disposed on the face thereof facing the reflector 42. If so desired, the antenna projection 48 may be enclosed in a protective sheath, preferably made of a plastic, and shown in dotted lines at 56, and the whole antenna assembly may be protected by a dome, as shown in dotted lines at 58.

On the other end of straight through waveguide 24 is mounted a straight waveguide 60 having its axis substantially at right angle to the axis of straight through waveguide 24 and forming therewith a hybrid junction or "Magic T." Waveguide 60 has two equal length arms 61 and 62 provided with diode detectors 63 and 64 at the respective terminations of the arms.

A waveguide 66 is disposed substantially parallel to straight through waveguide 24 and is provided with connecting elbow 68 and 70 for connection respectively to the straight through waveguide 24 proximate the end therewith on which is mounted short waveguide 30 acting as a feeder from klystron 26 and with waveguide 60 substantially at the center thereof. Waveguide 66 defines a 90° twist as shown at 72.

An attenuator 74 made, for example, of a threaded member capable of manual adjustment in and out of the interior of straight through waveguide 24 is disposed as shown on FIG. 4 to modify the microwave transmission through straight through waveguide 24 in order to compensate for losses in the two elbows and 90° twist of shunt waveguide 66. Normally, attenuator 74 is preadjusted so that, with power fed into the microwave section from klystron 26 and being radiated by antenna 36, with no reflected waves being received by the antenna, diode detectors 63 and 64 supply at their outputs steady state DC voltages of equal values.

Preferably, the microwave waveguides are made of RG 52/U rectangular brass waveguide material, the klystron 26 is operated in the 10 gc. (X-band) frequency, with a 100 milliwatt output, and consists of a WL 147 reflex glystron made by Westinghouse Electric Corporation, or the like. The two diode detectors 63 and 64 are preferably of the 1N 31C type.

When reflected waves are detected by antenna 36 and the Doppler frequency between the transmitted wave frequency and the received wave frequency is zero, which is the case when the relative motion between the vehicle on which the antenna 36 is mounted and the obstacle is nonexistent, the steady state DC voltages at the outputs of diode detectors 63 and 64 remain equal in values. However, any relative motion between the vehicle on which the antenna 36 is mounted and an obstacle in the beam pattern results in a Doppler frequency which upsets the steady state voltages at the outputs of diode detectors 63 and 64, and the doppler frequency is detected by diode detectors 63 and 64 in such a manner that the signals at their outputs are equal in amplitudes but +90° out of phase when the antenna and the obstacle are closing, and that the signals are equal in amplitudes but −90° out of phase when the antenna and the obstacle are opening relatively to each other. The frequency of the doppler frequency signals is proportional to the rate at which the antenna and the obstacle are closing or opening. Such signals are fed to two parallel channels, as hereinafter explained in further details, for the purposes of operating the controls of the vehicle on which the apparatus of the invention is installed.

Figure 6:
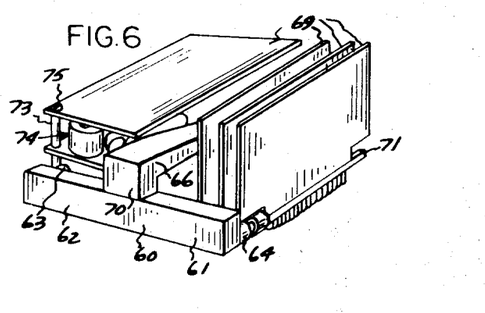
FIG. 6 is a schematic illustration of a preferred example of an apparatus according to the invention, shown in perspective view.

As shown in FIG. 6, all the associated electronic and electrical equipments and circuitries, power supplies, and the like, are mounted on circuit boards or cards 69 fastened to support members such as 71 attached by way of appropriate insulators and fasteners, such as shown at 73 and 75 respectively, to the microwave section 23 of the apparatus, in any conventional manner well known to persons skilled in the art.

Figure 7:
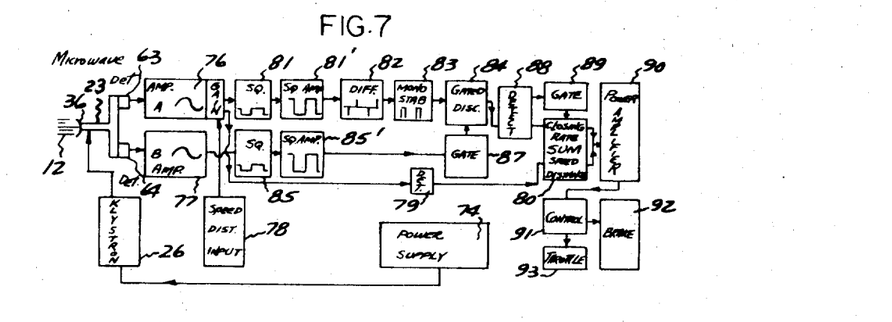
FIG. 7 is a simplified block diagram of the preferred example of the present invention.

As shown in the block diagram of FIG. 7, the microwave section 23 of the apparatus of the invention is supplied in microwave energy by klystron 26 obtaining its power from power supply 74. The Doppler frequency signals detected by diode detectors 63 and 64, which are equal in amplitudes but different in phase by +90° or −90° according to whether the antenna 36 and the obstacle are closing or opening, are fed to parallel channels, hereinafter identified as channel A and channel B respectively. diode detector 63 being connected to channel A amplifier 76 and diode detector 64 being connected to channel B amplifier 77. The overall gain of channel A amplifier 76 is modified by a speed distance input section 78, increasing the overall gain of the amplifier in proportion to the speed of the vehicle on which the apparatus of the invention is installed. The amplified signals at the output of channel A amplifier 76 are fed to a branch in which they are detected by means of detector 79 providing a variable direct current of a value proportional to the amplitude of the signal at the output of amplifier 76, consequently providing a variable DC signal proportional to the rate of closing or opening between the vehicle and the obstacle, such rate being determined from the amplitude of the Doppler frequency signals as modified by the speed-distance input from speed-distance input section 78. The variable DC signal at the output of detector 79 is fed to a summing network 80 for the purpose to be hereinafter indicated.

The Doppler frequency signals at the output of channel A amplifier 76 are also fed to a second branch wherein the signals are squared in squaring network 81, and the squared signals are in turn amplified in squared signal amplifier 81' and differentiated in the differentiating section 82 of the circuit. The positive pulses of the differentiated signals at the output of differentiating section 82 are utilized to trigger a monostable multivibrator 83 which provides at its output spike signals of preferably 30 millisecond duration, of approximately 2 volt amplitude and of a frequency equal to the frequency of the square signals at the input of differentiating section 82. The signals at the output of the monostable multivibrator 83 are in turn fed to the input of a gated discriminator 84. The signals amplified by channel B amplifier 77 and which are, as previously mentioned, equal in amplitudes but out of phase with the signal amplified by channel A amplifier 76 by ±90°, are squared through squaring network 85 and amplified through amplifier 85'.

The amplified squared signals at the output of amplifier 85' are fed to gate 87 adapted to control gated discriminator 84. If the signals through channel A and channel B are +90° out of phase at the output of square signal amplifier 81' gate 87 opens gated discriminator 84, as will be explained hereinafter in further details. However, if the signals through channel A and channel B are originally −90° out of phase, the signals from the output of monostable multivibrator 82 do not pass through gated discriminator 84 because the discriminator is inhibited by gate 87, as will also be explained hereinafter in further details. Consequently, Doppler frequency signals corresponding to an opening between the vehicle and an obstacle are rejected and Doppler frequency signals corresponding to a closing therebetween are allowed to pass through gated discriminator 84 to be converted to the Doppler frequency signal frequency. This DC signal is fed both to gate 89 and to summing network 80, such that gate 89 enables summing network 80 to operate only when a DC signal is present at the output of detector 88. When a DC signal is present at the output of detector 88, this DC signal which, as previously mentioned, is proportional to the frequency of the Doppler frequency signal, is summed up with the DC signal at the output of detector 79 which, as previously explained, is proportional to both the speed at which the vehicle is moving and the distance separating the vehicle from the obstacle. Consequently, the output of summing network 80 provides a variable DC signal which is a function respectively of the rate of closing between the vehicle and the obstacle, of the distance separating the vehicle from the obstacle and of the instantaneous speed of the vehicle.

It must be appreciated that the action of the speed-distance input section 78 is such that the overall gain of channel A amplifier 76 is considerably reduced at low instantaneous speed of the vehicle in such a manner that, under some circumstances of combined slow speed of the vehicle and/or slow closing rate between the vehicle and the obstacle, there are no signals at the output of amplifier 76 or the signals at the output of the amplifier are too small in amplitude to have any effect upon the differentiator 82, resulting in no action upon the controls of the vehicle, if the obstacle is positioned beyond the ranges of the apparatus as identified by zones 14, 16, 18 and 20 in FIG. 1–3. As it is evident however that the gain at the output of amplifier 76 is modified progressively in function of the speed-distance information, the graphic illustration of the range as defined by the zones in the drawing are shown for illustrative purposes only and not as a representation of actual finite range zones for the apparatus of the invention. The variable DC signal at the output of the summing network 80, after amplification through DC power amplifier 90, is used, by means of control section 91, for operation, of the brake 92 and of the accelerator or throttle 93 of the vehicle.

It can thus be seen that the controls of the vehicle are automatically operated according to the invention only if the following conditions are present:

A. An obstacle is situated in the microwave beam forwardly radiated in the path of the vehicle;

B. The obstacle is located at a distance from the vehicle which renders hazardous the operation of the vehicle when its speed and the required braking distance at that speed are considered;

C. The distance between the vehicle and the obstacle is decreasing at a rate which indicates an imminent danger of collision.

An apparatus according to the invention is thus capable of automatically manipulating the controls of a self-propelled vehicle by integrating different quantitative and qualitative inputs indicating the existence of a dangerous situation and is also capable of operating the controls of the vehicle in such a manner as to maintain at all times a safe distance between the vehicle and an immediately preceding vehicle or between the vehicle and an obstacle.

Figures 8, 9:
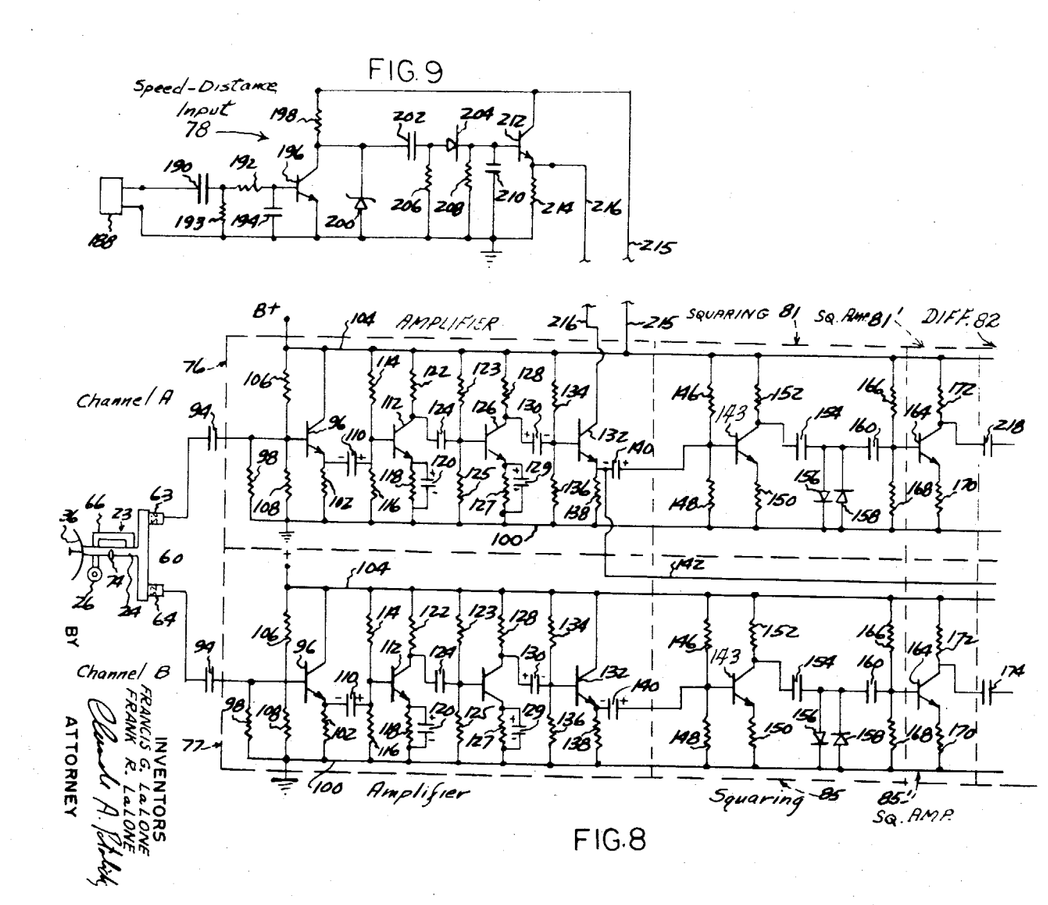
FIG. 8 is a detailed circuit diagram of an example of a practical embodiment of a portion of the circuitry illustrated in block form in the diagram of FIG. 7.
FIG. 9 is a circuit diagram of another portion of the block diagram of FIG. 7.

Referring now in general to FIGS. 8-12 that illustrate in details the circuit shown in block diagram form in FIG. 7, of an example of an embodiment according to the present invention, and with particular reference to FIG. 8, the AC Doppler frequency voltages developed by diode detectors 63 and 64 are applied respectively, as previously mentioned, to channel A and to channel B. The arrangement of the Doppler frequency signal amplifier 76, squaring network 81 and squared signal amplifier 81' of channel A being the same as the arrangement of Doppler frequency signal amplifier 77, squaring network 85 and squared signal amplifier 85' of channel B, a description of the structure with respect to the elements of channel A will suffice and will avoid repetition.

The diode detector 63, connected to channel A, is coupled through a coupling capacitor 94 to the base of an NPN transistor 96 and to a load resistor 98 connected between the base of transistor 96 and common grounded line 100. Voltage signals corresponding to the current signals detected by diode detector 63 appear across load resistor 98 and such voltage signals applied to the base of transistor 98 also appear across load resistor 102 connected between the emitter terminal of transistor 96 and common ground line 100. The collector of transistor 96 is connected to the B+ common line 104, and the base of the transistor is biased by way of a voltage divider network formed by equal resistance resistors 106 and 108, such that transistor 96 operates as an emitter follower for the purpose of insulating the output of diode detector 63 from the input of the first amplifier stage and of providing proper impedance matching. The signals appearing across the emitter load resistance 102 of transistor 96 are applied through capacitor 110 to the base of an NPN transistor 112 forming the first amplification stage of amplifier 76. The base of transistor 112 is biased by way of a voltage divider network consisting of resistors 114 and 116 disposed between B+ line 104 and grounded line 100, and also by way of resistor 118 connected between the emitter of the transistor and the grounded line and shunted by way of capacitor 120. The amplified signals appearing across the collector load resistor 122 of transistor 112 are applied through coupling capacitor 124 to the base of an NPN transistor 126 forming the next amplification stage. Transistor 126 is biased by way of a voltage divider formed by resistors 123 and 125 connected between its base and respectively the B+ line 104 and the grounded line 100, and a resistor 127 shunted by a capacitor 129 between its emitter and ground. The amplified signals appearing across the collector load resistor 128 of transistor 126 are applied through a capacitor 130 to the base of an NPN transistor 132 biased by way of a voltage divider consisting of resistors 134 and 136 of equal resistances so as to cause transistor 132 to operate as an emitter follower. The signals appearing across the emitter load resistor 138 of transistor 132 are applied through a capacitor 140 to the input of the squaring network 81, and also by way of a line 142 to the anode of detector 79, FIG. 10, consisting of a diode 144, and of a load resistor 145 connected between the cathode of the diode and ground line 100, load resistor 145 being shunted by capacitor 147 passing to ground the AC component of the detected signals. Consequently, across load resistor 145 appears a DC voltage proportional to the amplitude of the Doppler frequency signal amplified through channel A amplifier 76, such amplitude, as previously mentioned, being inversely proportional to the distance between the vehicle and the obstacle. This DC signal is applied by way of line 150 to the input of the summing network 89.

The Doppler frequency signals applied through amplifier 76 are applied by way of coupling capacitor 140, FIG. 8, to the input of squaring network 81 consisting of an NPN transistor 143, the base of which is appropriately biased by means of a voltage divider network consisting of resistors 146 and 148, the common junction of which is connected to the base of the transistor, and a resistor 150 connected in the emitter circuit of the transistor. The signals applied to the base of transistor 143 appear as amplified signals across collector resistor 152 and are fed through a capacitor 154 to a clipping network consisting of a shunt limiter arrangement comprising diodes 156 and 158 placed in parallel and in opposite biases so as to act as a lower clamp and an upper clamp, respectively. The clipped signals or squared signals, are then applied through capacitor 160 to the input of squared signal amplifier 81' consisting of transistor 164 appropriately biased by a voltage divider network formed by resistors 166 and 168 connected to its base and by an emitter bias resistor 170 connected between its emitter and ground. The amplified squared signals appearing across the load resistor 172 between the collector of transistor 164 and the B+ line 104 are applied, through capacitor 218, to the input of the differentiator 82.

Channel B Doppler frequency signal amplifier 77, squaring network 85 and squared signal amplifier 85' are exactly similar to the corresponding circuit portions of channel A, with the exception that there is no branch line such as 142 connected to the detector such as 79 at the output of channel B amplifier 77.

In addition, only the gain of channel A Doppler frequency signal amplifier 76 is modified at its output by way of the circuit of the speed-distance section 78, as hereinafter explained in detail. The amplified squared signals appearing at the output of channel B squared signal amplifier 85' across the load resistor 172 in the collector circuit of transistor 164 are applied through capacitor 174, FIG. 10, to the base of an NPN transistor 176 connected in emitter follower arrangement by having equal resistors 178 and 180 forming a voltage divider providing appropriate bias for the base of the transistor, transistor 176 further having a load resistor 182 connected between its collector and the common ground line 100. The square signals appearing across emitter load resistor 182 are applied through coupling capacitor 184 and adjustable attenuator resistor 186 to the input of gate 87, for the purpose to be hereinafter explained in details.

Referring now particularly to FIG. 9 in the drawings, the speed-distance input section 78 takes its input signal from the vehicle ignition distributor 188 through coupling capacitor 190. Because such signals are of too large amplitudes, they are reduced in amplitude by being passed through the attenuating network comprising series resistor 192 and shunt resistor 193 connected between the junction of capacitor 190 with series resistor 192 and ground, and a capacitor 194 connected between the output terminal of series resistor 192 and ground. The attenuated signals are fed to the base of an NPN transistor 196 having its emitter grounded and its collector connected to a load resistor 198. A Zener diode 200 is connected between the collector of transistor 196 and ground so as to provide a constant voltage across the collector emitter circuit of the transistor. The Zener diode operating as a clamp, the signals across resistor 198 appear as a series of constant spikes of a frequency corresponding to the input signal frequency, thus corresponding to the speed of rotation of the distributor which in turn is proportional to the speed of revolution of the vehicle engine. The variable frequency constant amplitude spikes appearing across load resistor 198 are fed through capacitor 202 to a discriminating network comprising series forward diode 204 having a filter resistor 206 between its anode and ground and a resistor 208 shunted by a capacitor 210, between its cathode and ground. The signals rectified by diode 204 are used to charge capacitor 210 to an average voltage tending to discharge to ground through resistor 208. Consequently the base of an NPN transistor 212 connected to the junction between capacitor 210 and resistor 208 is held at a variable DC voltage depending, from the RC constant of the circuit, and which is proportional to the frequency applied to the input of the circuit, consequently proportional to the revolution speed of the vehicle engine. The emitter of transistor 212 is biased by way of a resistor 214, and the collector of the transistor is directly connected to the B+ common line 104 by a line 215, Under those conditions, the emitter of transistor 212 is always at a voltage slightly below the voltage of the base thereof, thus causing the transistor to behave as a DC amplifier, supplying through line 216 to the collector of transistor 132, FIG. 8, a variable DC voltage varying the gain of amplifier transistor 132 so as to considerably reduce the amplitude of the signals at the output of amplifier 76 in inverse proportion to the speed of the vehicle.

Figure 10:
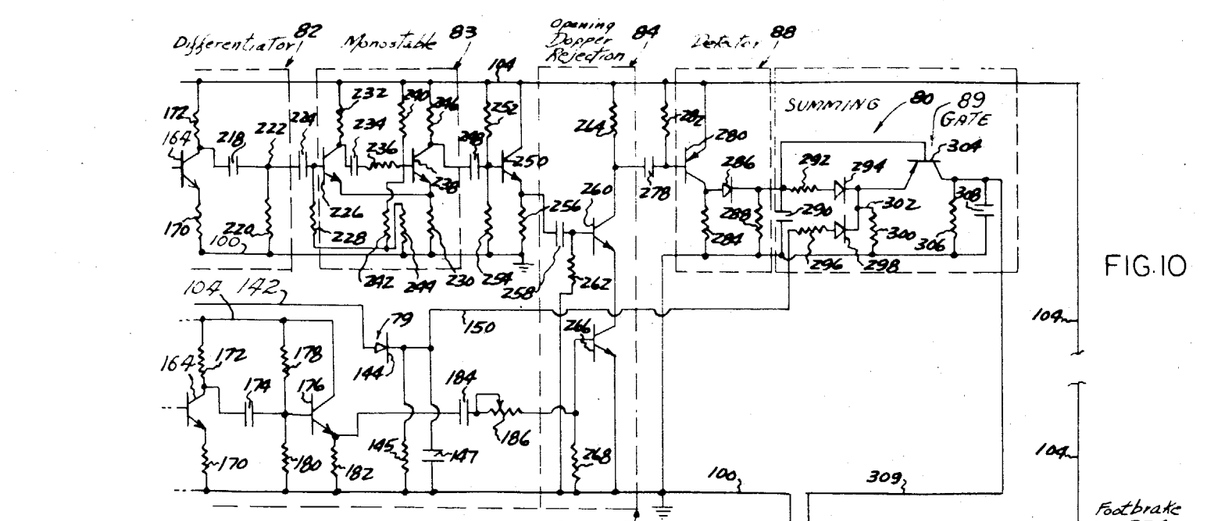
FIG. 10 is a circuit diagram of still another portion of the block diagram of FIG. 7.
Figure 13:
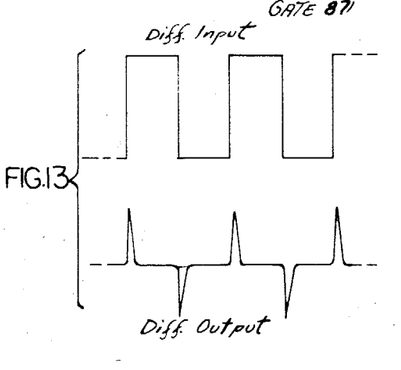
FIGS. 13 to 15 are wave shape diagrams useful in explaining the principles of the present invention.

Referring now to FIG. 10, the amplified squared signals from channel A appearing across collector load resistor 172 of transistor 164 are fed to differentiating network 82 comprising a capacitor 218, connected to the collector of transistor 164, and a resistor 220 connected between the output of capacitor 218 and ground. In view of the RC network formed by resistor 220 and capacitor 218, the horizontal portions of the square signal are eliminated so that at point 222 of the circuit appear only spikes corresponding to the leading edges and trailing edges of the input signal, as represented in the graph of FIG. 13 comparing the waveforms at the input with the waveforms at the output of the differentiator 82. Those spikes are applied through a capacitor 224 to the input of monostable multivibrator 83 comprising an NPN transistor 226 having its base-emitter junction reverse biased by way of resistor 228 in its base circuit and resistor 230 in its emitter circuit. In this manner, the transistor 226, in a quiescent state, is held at cutoff in view of the base-emitter bias, and every positive spike applied to the base of transistor 226 through capacitor 224 triggers the transistor to conduct so that a current flows through the collector emitter circuit thereof. This current flow causes a voltage to appear across load resistor 230 connected between the collector of the transistor and ground. The negative spikes on the contrary drive the base of transistor 226 further negative so that the transistor is held further at cutoff and no pulses appear at its output.

The pulses at the output of transistor 226 are applied through capacitor 234 and resistor 236 to the base of an NPN transistor 238, biased by way of a voltage dividing network consisting of resistor 240 connected between B+ common line 104 and the base of the transistor and resistors 242 and 244 in series across grounded common line 100 and the base of the transistor. Signals applied to the base of transistor 238 appear across the collector load resistor 246 and are applied through coupling capacitor 248 to the base of emitter follower NPN transistor 250, having its base biased by way of a voltage divider consisting of equal value resistors 252 and 254 connected between B+ common line 104 and ground and having their common endings connected to the base of the transistor. The pulses appearing across the load resistor 256 in the emitter circuit of transistor 250 are applied through coupling capacitor 258 to the input of gated discriminator 84. The emitter follower 250 acts as a coupling for proper impedance matching between the output of the monostable vibrator 83 and the input of gated discriminator 84 providing for opening Doppler rejection.

Gated discriminator 84 comprises a first NPN transistor 260 having its base connected to coupling capacitor 258, such base being provided with biasing resistor 262, the collector of transistor 260 being connected to B+ common line 104 through load resistor 264. A second NPN transistor 266, having its base biased by way of resistor 268, is connected in such manner that both transistors 260 and 266 have their collector-emitter circuits disposed in series, as a result of the emitter of transistor 260 being connected to the collector of transistor 266, and the emitter of transistor 266 being grounded. The pulses at the output of monostable multivibrator 83 are applied through coupling capacitor 258 to the base of transistor 260, and the squared signals from channel B are applied to the base of transistor 266 through adjustable attenuator resistor 186, transistor 266 acting as the gate, shown at 87 in FIG. 7, for gated discriminator 84. When pulses are applied to both bases of transistors 260 and 266 in coincidence, both transistors which are normally biased at cutoff are now momentarily biased to a conducting state and current flows from B+ common line 104 to grounded line 100 through the series collector-emitter circuits of the transistors. Consequently, a signal appears across load resistor 264. On the other hand, when a signal appears at the base of either transistor 260 or transistor 266 in timing other than coincidence, even though the collector emitter circuit of either one of the transistors is caused to become conductive, because the collector emitter circuit of the other transistor is at cutoff, no signal appears across load resistor 264, because no current can flow from B+ common line 104 to grounded common line 100.

Figure 14:
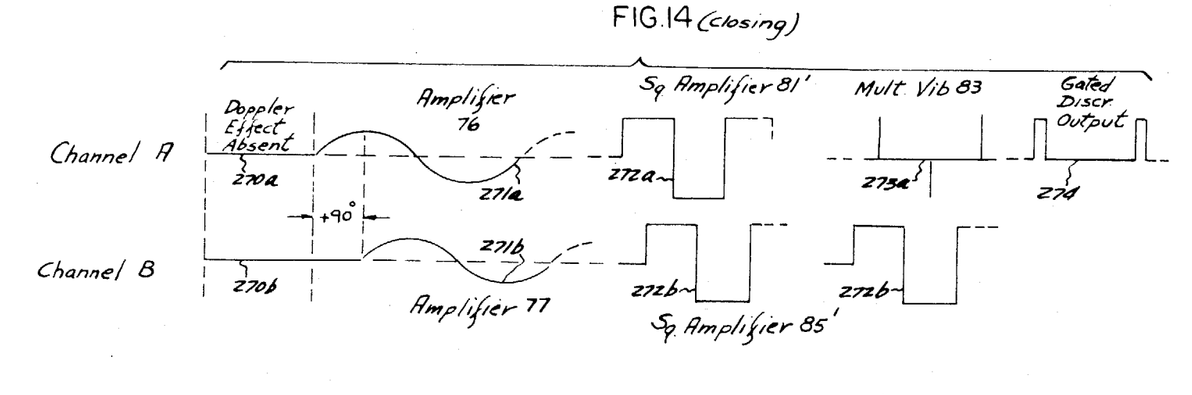

As apparent from an examination of the typical waveforms of FIG. 14, only in the case of a closing Doppler signal would the input signals at the base of transistors 260 and 266 be in coincidence in time, so that signals would appear at the output consisting of load resistor 264.

FIG. 14 shows samples of characteristic waveforms at different portions of the circuit according to the invention illustrated in block diagram at FIG. 7 and in details in FIGS. 8-11, in the case of a closing Doppler frequency resulting from closing between the vehicle and an obstacle, the upper waveforms relating to channel A and the lower waveforms relating to channel B. Without Doppler effect, that is in the event that either there is no reflection from an obstacle or that there is a reflection from an obstacle situated at a constant distance from the vehicle, a DC voltage level appears at the output of both microwave diode detectors 63 and 64, as shown by curves 270a and 270b. In the event of a closing Doppler effect, the signals detected by diode detector 63 and 64 and amplified through amplifiers 76 of channel A and 77 of channel B, respectively, resemble respectively curves 271a and 271b, and are such that the signals through channel A are of the same amplitude as the signals through channel B and that the signals through channel B are ahead of the signals through channel A by 90° in phase. Waveforms 272a and 272b represent the signal shapes at the outputs of squaring amplifiers 81' and 85' respectively, still being out of phase by 90°. The output at the multivibrator 83 consists of alternately positive and negative spikes as shown by waveform 273a, and it can be seen that every positive spike of waveform 273a corresponds to a positive square pulse of waveform 272b, while every negative spike also coincides in time with a negative square pulse of waveform 272b. Consequently in view of the coincidence in timing between the gated signals of waveform 273a and the gating signals of waveform 272b, there is produced at the output of gated discriminator 84 a series of signals such as shown by waveform 274.

Figure 15:
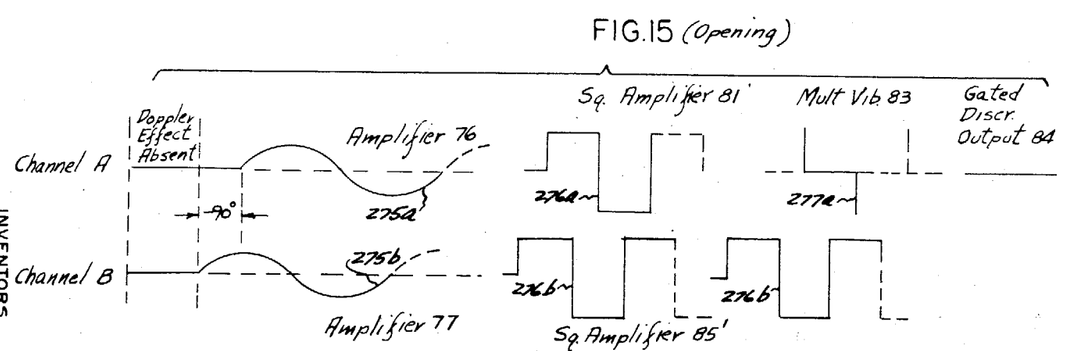

In the case of opening Doppler signals, as shown in FIG. 15, the Doppler frequency signals through amplifiers 76 of channel A and 77 of channel B respectively are as shown by waveforms 275a and 275b, the signals being still of equal frequencies and amplitudes but the phase of the channel B signals being swung 180° relatively to the signals corresponding to closing, as hereinbefore explained in detail. Consequently, the waveforms at the output of squared wave amplifier 81' and 85', respectively, are similar to waveforms 276a and 276b respectively. The signals at the output of the monostable multivibrator 83 are according to waveform 277a, in all points similar to curve 273a of FIG. 14, while the signals at the output of the square signals amplifier 85' of channel B are according to waveform 276b, which is 180° out of phase with respect to waveform 272b of FIG. 14. Consequently, every positive pulse at the output of multivibrator 83 corresponds to a negative pulse at the output of square signal amplifier 85' of channel B, and vice versa, resulting in no output from gated discriminator 84. Consequently, in the event of opening between the vehicle and an obstacle resulting in an opening Doppler frequency, no signal is applied to the input of detector 88 of FIGS. 7 and 10, while on the contrary, in cases where there is a closing Doppler frequency, a signal is applied to the input of the detector 88.

Referring again to FIG. 10, signals appearing at the output of gated discriminator 84 are applied through coupling capacitor 278 to the input of detector 88 which comprises an amplification stage including a PNP transistor 280 provided with base bias resistor 282 connected to B+ common line 104, and having its emitter directly tied to the B+ line 104 and its collector grounded through load resistor 284. Signals applied to the base of transistor 280 appear amplified across load resistor 284 in the collector-emitter circuit of the transistor, and are rectified by diode 286. The rectified signals are applied to an RC network consisting of a resistor 288 shunted by a capacitor 290, both being connected between the cathode of diode 286 and grounded common line 100. The variable DC signals appearing at the common junction between resistor 288 and capacitor 290, and of a value depending from the RC constant of the network, are applied to the summing network 80 consisting of a first branch comprising a resistor 292 and a blocking diode 294 in series, and of the second branch consisting similarly of a resistor 296 and a blocking diode 298 also in series, with the cathode of both diodes connected to one end of resistor 300, the other end of which is connected to ground. The DC signals from detector 88 are fed to the first branch of the summing network, consisting of resistor 292 and diode 294, while the DC signals originating from the speed-distance input 78, as rectified by rectifier 79, are applied to the input of the summing network branch consisting of resistor 296 and diode 298 and are caused to flow to ground across resistor 300. A variable DC signal proportional to the sum of the variable DC current signals flowing through resistor 300 appears thereacross at junction 302, common to the cathodes of both diodes 294 and 298 and to the ungrounded end of resistor 300, and the resultant DC variable voltage signal is applied to the emitter of a PNP transistor 304, having its base tied to the input of the first branch of the summing network 80 consisting of resistor 292 and diode 294. Only when a DC voltage signal appears at the input of the summing network is the base of transistor 304 so biased that the emitter-collector circuit thereof is capable of conducting. Consequently, the DC voltage signal developed at the input of the summing network and originating from channel A, which exists only when there is a closing Doppler frequency received by the apparatus of the invention, is used to gate the signal at the output of the summing network in such a manner that such signal at the output of the summing network appears at the output of the switch or gate defined by transistor 304 only when the vehicle is closing upon an obstacle.

Figure 11:
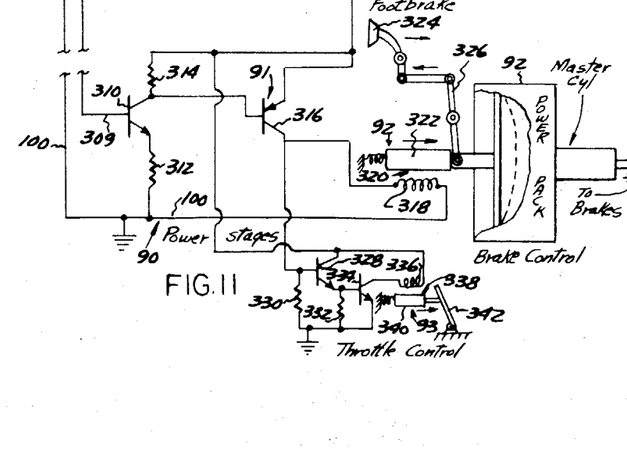
FIG. 11 is a schematic representation of the power amplification and vehicular control portions of the block diagram of FIG. 7.

Under those conditions, a signal appears across the collector load parallel network of transistor 304 consisting of a resistor 306 shunted by a capacitor 308, connected between ground and the collector of the transistor. The variable DC signal appearing across load resistor 306 is applied via line 309 to the input of a DC power amplifier 90, as shown in FIG. 11, and comprising an NPN transistor 310, to the base of which the variable DC signal is applied, and having an emitter bias resistor 312 connected between the emitter and ground and a load resistor 314 connected between its collector and B+ common line 104. The variable DC amplified signal appearing across load resistor 314 is applied to the base of a PNP transistor 316, defining the control portion of the block diagram of FIG. 7, which has its emitter tied to B+ common line 104 and in its collector circuit the coil 318 of a solenoid 320 adapted to operate solenoid plunger 322. One end of the solenoid plunger 322 is adapted to operate the brake control 92 of the vehicle, which also includes manually operated foot brake pedal 324 actuating the brake control 92 by way of linkage 326. When a DC signal exists at the output of summing network 80 and is gated through gate 89, including transistor 304, which is the case when there is a closing between the vehicle and an obstacle, this DC signal, after being amplified as previously explained, operates solenoid 320 so that plunger 322 is displaced in the direction of the arrow against its return spring, thus applying the brakes proportionally to the value of the DC signal which, as previously explained, is proportional to the rate of closing between the vehicle and the obstacle, the instantaneous speed of the vehicle and the distance separating the vehicle from the obstacle. It can also be seen that, in any event, foot brake pedal 324 may be operated by the vehicle operator so as to override the action of the automatic brake control device of the invention.

In addition, the signal appearing at the collector of transistor 316 is also applied to the base of an NPN switch transistor 328 having its base biased by way of resistor 330, its collector directly tied to B+ common line 104 and a load resistor 332 disposed between its emitter and ground. The bias at the base of transistor 328 is selected such that the transistor is normally in a cutoff condition except when a signal appears at the collector of transistor 316 of a value sufficient to counterbalance the bias, thus causing transistor 328 to conduct, with the result that a signal appears across transistor 328 load resistor 332. This signal is applied to the base of a second NPN transistor 334, which is thus caused to conduct in such a manner that a current flows through its collector-emitter circuit and consequently through the coil 336 of a solenoid 338 having plunger 340.

Plunger 340 is displaced in the direction of the arrow against its return spring and is adapted to tap on the accelerator control pedal 340 so as to vibrate such pedal as a warning to the vehicle operator of the fact that the vehicle is approaching an obstacle in a dangerous manner.

This throttle or accelerator control arrangement, designated generally by numeral 93 in FIGS. 7 and 11, can evidently be arranged in such a manner that solenoid 338 has its plunger 340 tied to an appropriate loose link connection in the throttle control of the vehicle so as to release the throttle when activated, instead of tapping on the accelerator as a warning to the vehicle operator.

Figure 12:
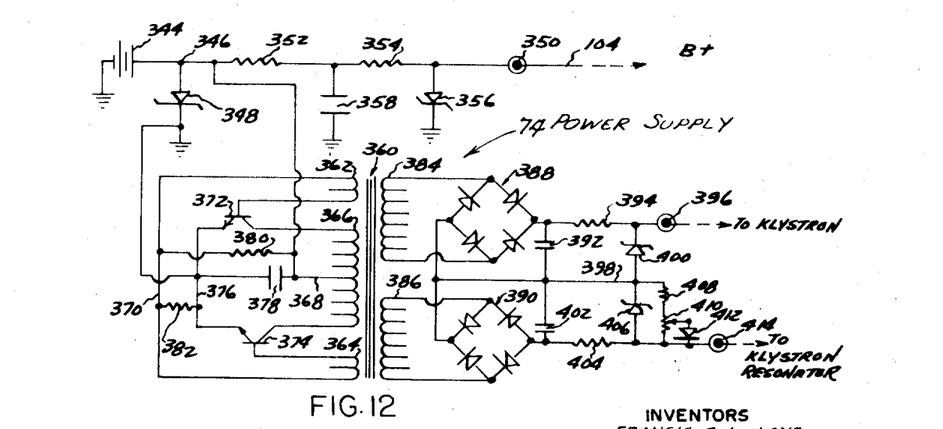
FIG. 12 is a circuit diagram of an example of power supply of the block diagram of FIG. 7.

Referring to FIG. 12, there is shown a power supply corresponding generally to power supply 74 of the block diagram of FIG. 7. The power supply of FIG. 12 takes its input from the battery of the vehicle, on which the apparatus of the invention is installed, such battery being shown in the drawing at 344, the negative terminal of the battery being grounded and the positive terminal being connected to the input positive terminal 346 of the power supply. A Zener diode 348 is placed between input terminal 346 and ground, Zener diode 348 establishing a voltage regulation substantially equal to 12 volts irrespective of voltage variations above 12 volts at the positive terminal of the battery 344. Terminal 346 is connected to B+ output terminal 350, which is in turn connected to B+ common line 104 of the circuit of FIGS. 8–11, voltage dropping and filter series resistors 352 and 354 being connected between the input terminal 346 and the output terminal 350 with the result that the voltage at the output terminal 350 is dropped to 10 volts, Zener diode 356 being disposed between the output terminal 350 and ground so as to maintain the voltage at terminal 350 above ground to a substantially constant value. A capacitor 358 is disposed between the common junction of resistors 352 and 354 and ground, so as to further eliminate voltage ripples at the output.

The power supply of FIG. 12 also includes a DC to DC converter for providing the high DC voltage supply to the klystron. Such DC to DC converter comprises a saturable core transformer 360 having in its primary short windings 362 and 364 of, for example, ten turns each, together with a long winding 366 having, for example, sixty turns, provided with a center tap 368. Two opposite ends of windings 362 and 364 are tied together by way of a line 370, the other end of winding 362 being connected to the base of a first NPN transistor 372, while the other end of winding 364 is connected to the base of a second NPN transistor 374. The collectors of both transistors are connected to the ends of long winding 366 and their emitters are tied together to ground by way of a line 376. The center tap 368 of winding 366 is connected to the +12 volt terminal 346, a capacitor 378 being connected between the center tap and ground. A rersistor 380 is disposed between center tap 368 and line 370, while a lower value resistor 382 is connected between line 370 and grounded line 376.

The arrangement thus described acts as a free running multivibrator. The bases of both transistors 372 and 374 are negatively biased by common resistor 382 so that in a quiescent state both transistors collecter-emitter circuits are cut off. When the power supply is first turned on, the base bias of each transistor is raised to a predetermined value as the result of each base being now connected to +12 volts terminal 346 through resistor 380 with the result that both transistors tend to be simultaneously turned on. However, in view of the unbalance existing between the apparently similar circuits of transistors 372 and 374, due to differences in component characteristics one of the transistors is turned on before the other or conducts more than the other. Assuming that transistor 372 conducts more heavily, more current flows through the half section of winding 366 connected between tap 368 and the collector of transistor 372. This current flow induces a voltage to be developed across short winding 362, thus causing the base of transistor 372 to be made more positive, driving the transistor to heavy conduction. At the same time that a voltage was induced in short winding 362 that rendered the base of transistor 372 more positive, a voltage in the opposite direction was induced in short winding 364 rendering the base of transistor 374 more negative, thus driving transistor 374 to cut off.

The flux in the core of transformer 360 rapidly reaches saturation resulting in no further increase of the flux even though the current flow through the precedently mentioned half of winding 366 may still tend to increase. As a result of this flux saturation, the voltages induced in windings 362 and 364 collapse, removing the driving voltage applied to the base of transistor 372, thus turning the transistor back to cutoff. Current flow in the collector-emitter circuit of transistor 372 and through the first half of winding 366 stops, causing the flux in the transformer core to collapse. Due to this flux collapse, voltages of opposite polarities to those previously induced in short windings 362 and 364 are now induced therein, with the result that transistor 372 is driven further to cutoff and transistor 374 is driven to conduction, thus causing current to flow through the second half of winding 366 between tap 368 and the collector of transistor 376.

The cycle precedently described repeats itself as long as tap 368 is connected to +12 volts terminal 346, thus developing induced current flows through the windings 384 and 386 at the secondary of saturable core transformer 360. The current flows through windings 384 and 386, which may consist for example of one thousand fifty and seven hundred fifty turns, respectively, establishing substantially high voltages thereacross because of the turn ratios between the primary and secondary windings, are rectified by way of, respectively, diode rectifier bridges 388 and 390 arranged in parallel in voltage doubler fashion, rectifier bridge 388 being arranged to connect, through shunt filter capacitor 392 and series filter resistor 394 with a terminal 396 maintained at a predetermined voltage over line 398, common to both rectifier bridges, by way of a Zener diode 400. The second rectifier bridge 390 is provided with a filter network consisting of capacitor 402 and resistor 404, a Zener diode 406 being arranged so as to provide a substantially constant DC voltage across a voltage divider formed by fixed resistor 408 and adjustable resistor 410. A diode 412, preventing current reversal, has its anode connected to the slider of variable resistor 410 and its cathode connected to a terminal 414, terminal 414 being in turn connected to the klystron resonator. Terminal 396 is connected to the klystron so as to supply the beam voltage thereof.

An example of a practical commercial embodiment of the invention has been built using the components listed in the following table:

| Resistors: | Value (ohms) |
| --- | --- |
| 98 (2) | 180 |
| 106 (2) | 20K |
| 108 (2) | 20K |
| 102 (2) | 20K |
| 114 (2) | 100K |
| 116 (2) | 10K |
| 118 (2) | 1K |
| 122 (2) | 4.7K |
| 123 (2) | 100K |
| 125 (2) | 10K |
| 127 (2) | 360 |
| 128 (2) | 8K |
| 134 (2) | 10K |
| 136 (2) | 10K |
| 138 (2) | 3K |
| 145 | 10K |
| 146 (2) | 4.7K |
| 148 (2) | 10K |
| 150 (2) | 460 |
| 166 (2) | 47K |
| 168 (2) | 10K |
| 170 (2) | 560 |
| 172 (2) | 4.7K |
| 178 | 10K |
| 180 | 10K |
| 186 | 20K |

| Resistors: | Value (ohms) |
|---|---|
| 192 | 80K |
| 206 | 10K |
| 208 | 20K± |
| 214 | 1K |
| 220 | 10K |
| 228 | 2.7K |
| 230 | 680 |
| 232 | 1.5K |
| 236 | 3.3K |
| 240 | 1.5K |
| 242 | 75 |
| 244 | 680 |
| 246 | 1K |
| 252 | 10K |
| 254 | 10K |
| 256 | 3K |
| 262 | 10K |
| 264 | 4.7K |
| 268 | 3K |
| 282 | 10K |
| 284 | 10K |
| 288 | 10K |
| 292 | 1K |
| 296 | 1K |
| 300 | 1K |
| 306 | 10K |
| 312 | 20 |
| 314 | 470 |
| 330 | 1.5K |
| 332 | 96 |
| 352 | 22 2W |
| 354 | 22 2W |
| 380 | 1.1K |
| 382 | 150 |
| 394 | 1.5K 1W |
| 404 | 6.8K ½W |
| 408 | 3K ½W |
| 410 | 20K ½W |

| Klystron: | Type |
|---|---|
| 26 | Westinghouse WL-147 |

| Transistors: | Type |
|---|---|
| 96 (2) | 2N708 |
| 112 (2) | 2N930 |
| 126 (2) | 2N338 |
| 132 (2) | 2N338 |
| 144 (2) | 2N708 |
| 164 (2) | 2N708 |
| 196 | 2N708 |
| 212 | 2N708 |
| 226 | 2N708 |
| 238 | 2N708 |
| 250 | 2N708 |
| 260 | 2N760 |
| 266 | 2N718 |
| 280 | 2N1307 |
| 304 | 2N338 |
| 310 | 2N3054 |
| 316 | 2N255A |
| 328 | 2N338 |
| 334 | 2N338 |
| 372 | 2N3054 |
| 374 | 2N3054 |

| Diodes: | Type |
|---|---|
| 63 | 1N31C |
| 64 | 1N31C |
| 79 | 1N485 |
| 156 (2) | 1N2069 |
| 158 (2) | 1N2069 |
| 204 | 1N2071 |
| 260 | SV6 |
| 286 | 1N485 |
| 294 | 1N485 |
| 298 | 1N485 |
| 348 | 1N1353 |
| 356 | VR-10 |
| 388 (4) | 1N2069 |
| 390 (4) | 1N2069 |
| 400 | Spec. H.v. |
| 406 | Spec. H.v. |
| 412 | 1N2069 |

| Capacitors: | Value (mfd.) |
|---|---|
| 94 (2) | 10 |
| 110 (2) | 8 |
| 124 (2) | 10 |
| 129 (2) | 27 |
| 130 (2) | 10 |
| 140 (2) | 10 |
| 147 | .05 |
| 154 (2) | 10 |
| 160 (2) | 10 |
| 174 | 10 |
| 184 | 10 |
| 190 | .1 |
| 194 | .005 |
| 202 | .01 |
| 210 | 50 |
| 218 | .001 |
| 224 | .02 |
| 234 | .01 |
| 248 | 10 |
| 258 | 10 |
| 278 | 4.7 |
| 290 | .05 |
| 308 | .5 |
| 358 | 500 |
| 378 | 50 |
| 392 | 30 |
| 402 | 30 |

It is evident that the speed-distance information useful for the operation of the apparatus of the invention may be taken from other than the convenient ignition distributor of the vehicle. Such an input information may be obtained from the speedometer, for example, or from the alternator-generator of the vehicle, and any one of the last mentioned schemes is available with diesel engined or turbine engined vehicles.

It is also evident that the types of transistors utilized in the herein disclosed embodiment of the invention is dependent on the circuit polarity chosen and that every NPN or PNP transistor may be replaced by opposite equivalent types as long as the polarities and arrangements of components are changed as is well known to those skilled in the art.

It can thus be seen that an apparatus according to the present invention is capable of determining whether a moving vehicle is gaining upon an obstacle and the rate of closing between the vehicle and the obstacle, and is capable of automatically manipulating the controls of the vehicle in function of such closing between the vehicle and the obstacle, the distance between the vehicle and the obstacle, the rate of closing therebetween, the instantaneous speed of the vehicle, in such a manner that the vehicle is automatically decelerated in the event of imminent collision and brought to a stop, or that the vehicle is slowed down so as to remain at a safe distance behind a moving obstacle directly in the path of the vehicle and traveling in the same direction as the vehicle.

Having thus described in the invention by way of an illustrative and exemplary embodiment thereof, what is desired to be protected by United States Letters Patent is as follows:

1. In a vehicle having a throttle control and a brake control, an anti-collision apparatus comprising microwave energy generating and microwave energy radiating means mounted on said vehicle, said microwave energy radiating means being adapted to radiate an unmodulated signal in the direction of motion of the vehicle and being further adapted to receive said signal when reflected from an obstacle in the path of said vehicle, detector means for developing from the amplitude of said received signal a first DC signal inversely proportional to the distance between said obstacle and said vehicle, means for increasing said first DC signal in function of the velocity of motion of said vehicle, means for developing Doppler signals of a frequency proportional to the rate of relative motion between said vehicle and said obstacle, means for amplifying said Doppler frequency signals through two separate channels, the gain of the first of said channels being modified in function of said first DC signal, means in both channels for squaring said Doppler frequency signals, means in said first channel for differentiating said squared signals, monostable multivibrator means triggered by pulses of a predetermined polarity at the output of said means for differentiating, means in said second channel for amplifying said squared signals, gating voltage means under the control of said amplified squared signals, gated discriminator means activated by coincidence of signals at the output of said monostable multivibrator means and of said gating means and adapted to reject signals of a phase differential corresponding to opening of distance between the vehicle and the obstacle, detector means for developing a second DC signal proportional to said discriminated Doppler frequency signals, summing means for algebraically adding said first and second DC signals, DC signal amplification means having an input connected to said summing means, vehicle control applying means activated by a signal at the output of said DC signal amplification means and power supply means for furnishing electrical power to said control system.

2. The apparatus of claim 1 wherein said means for supplying a second DC signal proportional to the velocity of motion of the vehicle comprises discriminator means connected to the distributor of said vehicle for supplying a DC signal proportional to the ignition spark frequency of said distributor.

3. The apparatus of claim 1 further comprising normally off switch means turned on by a signal at the output of said DC amplification means and solenoid means activated by said switch means when turned on for warning the operator of the vehicle of a closing between said vehicle and the obstacle by vibrating the throttle of said vehicle.

4. The apparatus of claim 3 wherein said solenoid means activated by said switch means is operatively connected to the throttle control of said vehicle to cause said throttle to be released.

5. The apparatus of claim 1 wherein said microwave energy radiating means comprises a parabolic reflector, a waveguide element projecting from said reflector and a resonant cavity mounted on the end of said waveguide element having two symetrically disposed apertures facing the surface of said reflector.

6. The apparatus of claim 1 wherein said summing means comprises gating means adapted to normally inhibit said summing means unless said second DC signal appears at the output of said detector means.

7. The apparatus of claim 1 utilizing exclusively solid state elements in the circuits thereof.

8. The apparatus of claim 7 wherein said microwave generating means comprises a reflex klystron.

9. The apparatus of claim 8 wherein said power supply means comprises voltage dropping and filtering means for providing a regulated DC voltage supply to said solid state elements from the normal electrical system of said vehicle and DC to DC converter means for providing high DC voltage supply for said reflex klystron.

10. In a vehicle having controls for regulating its velocity of motion, an anti-collision control system comprising microwave energy radiating means mounted on said vehicle and adapted to radiate a signal in the direction of motion of the vehicle, said microwave energy radiating means being further adapted to receive said signal when reflected from an obstacle in the path of said vehicle, means for developing from the amplitude of said received signal a first DC signal inversely proportional to the distance between said obstacle and said vehicle, means for developing a second DC signal proportional to the velocity of motion of said vehicle, means for adding said first and second DC signals for providing a third DC signal proportional to both the inverse of said distance and to said velocity of motion, means for developing Doppler signals of a frequency corresponding to the relative motion differential between said vehicle and said obstacle, means for amplifying said signals and means for squaring said amplified signals through separate channels, means in one channel for differentiating said squared signals, monostable multivibrator means triggered by said means for differentiating, gating means activated by the squared signals from the other channel, gated discriminator means activated by coincidence of signals at the output of said monostable multivibrator means and of said gating means, said coincidence of signals corresponding to a closing between said vehicle and said obstacle, detector means for developing a fourth DC signal proportional to the frequency of the signal at the output of said discriminator means, summing means for adding said third and fourth DC signals, DC signal amplification means having an input connected to said summing means and means activated by a signal at the output of said DC signal amplification means to actuate the controls of said vehicle to avoid a collision between said vehicle and said obstacle.

11. The control system of claim 10 wherein said means for supplying a second DC signal proportional to the velocity of motion of the vehicle comprises discriminator means connected to the distributor of said vehicle for supplying a DC signal proportional to the ignition spark frequency of said distributor.

12. The control system of claim 10 further comprising normally off switch means turned on by a signal at the output of said DC signal amplification means and solenoid means activated by said switch means when turned on for warning the driver of the vehicle of a closing between said vehicle and the obstacle by vibrating the throttle of said vehicle.

13. The control system of claim 10 wherein the normally off switch means activated by a signal at the output of said DC signal amplification means is adapted to actuate the brake and release the throttle of said vehicle in function of the value of said DC signal by actuating solenoid means operatively connected to said brake and throttle controls respectively.

14. The control system of claim 10 further comprising gating means controlled by said fourth DC signal for allowing said summing means to operate only when said fourth DC signal is developed at the output of said gated discriminator means.

15. In a vehicle having acceleration and deceleration controls, an anti-collision system comprising microwave energy radiating means mounted on said vehicle and adapted to radiate a signal in the direction of motion of the vehicle, said microwave energy radiating means being further adapted to receive said signal when reflected from an obstacle in the path of said vehicle, means for developing from the amplitude of said received signal a first DC signal inversely proportional to the distance between said obstacle and said vehicle, means for supplying a second DC signal proportional to the velocity of motion of said vehicle, means for developing Doppler signals of a frequency proportional to the rate of relative motions between said vehicle and said obstacle, means for rejecting Doppler signals corresponding to an increase of distance between said vehicle and said obstacle, means for developing a third DC signal proportional to the frequency of said Doppler signals, summing means for adding said first, second and third DC signals and means for actuating said vehicle controls in function of the sum of said DC signals.

16. The control system of claim 15 wherein said means for supplying a second DC signal proportional to the velocity of motion of the vehicle comprises means under the dependence of means adapted to give an indication of the velocity of motion of said vehicle for supplying a DC signal proportional to said velocity of motion.

17. The control system of claim 15 further comprising means for warning the driver of the vehicle of a decrease of distance between the vehicle and the obstacle.

References Cited

UNITED STATES PATENTS

| 2,804,160 | 8/1957 | Rashid | 180—98 |
| 2,996,137 | 8/1961 | Chu et al. | 180—98 |
| 3,293,600 | 12/1966 | Gifft | 180—98 X |

A. HARRY LEVY, *Primary Examiner.*

U.S. Cl. X.R.

180—77; 340—31; 343—7, 711